United States Patent [19]

Kinzenbaw

[11] Patent Number: 4,552,375
[45] Date of Patent: Nov. 12, 1985

[54] CONVERTIBLE IMPLEMENT FRAME PULLED LENGTHWISE IN THE TRANSPORT POSITION

[75] Inventor: Jon E. Kinzenbaw, Williamsburg, Iowa

[73] Assignee: Kinze Manufacturing, Inc., Williamsburg, Iowa

[21] Appl. No.: 534,965

[22] Filed: Sep. 22, 1983

[51] Int. Cl.⁴ .................. B60D 1/14; B62D 53/04
[52] U.S. Cl. .................. 280/415 R; 56/228; 172/288; 172/625; 280/444; 280/478 R; 280/491 C; 280/491 D
[58] Field of Search ........... 280/411 R, 411 A, 411 B, 280/412, 415 R, 444, 462, 478 R, 491 R, 491 B, 491 C, 491 D, 98, 100, 103, 95 R, 656; 172/625, 248, 282, 288, 289; 56/228

[56] References Cited

U.S. PATENT DOCUMENTS

| | | | |
|---|---|---|---|
| 2,982,363 | 5/1961 | Sweet et al. | 172/288 X |
| 3,516,500 | 6/1970 | Butler | 172/282 |
| 4,117,893 | 10/1978 | Kinzebaw | 280/656 X |
| 4,460,193 | 7/1984 | Dietz et al. | 280/415 R |
| 4,506,904 | 3/1985 | Kinzebaw | 280/415 R |

Primary Examiner—Joseph F. Peters, Jr.
Assistant Examiner—Mitchell J. Hill
Attorney, Agent, or Firm—Emrich & Dithmar

[57] ABSTRACT

An implement frame convertible between use and transport positions and pulled lengthwise for road transport has an improved hitch assembly and an improved transport steering mechanism.

12 Claims, 9 Drawing Figures

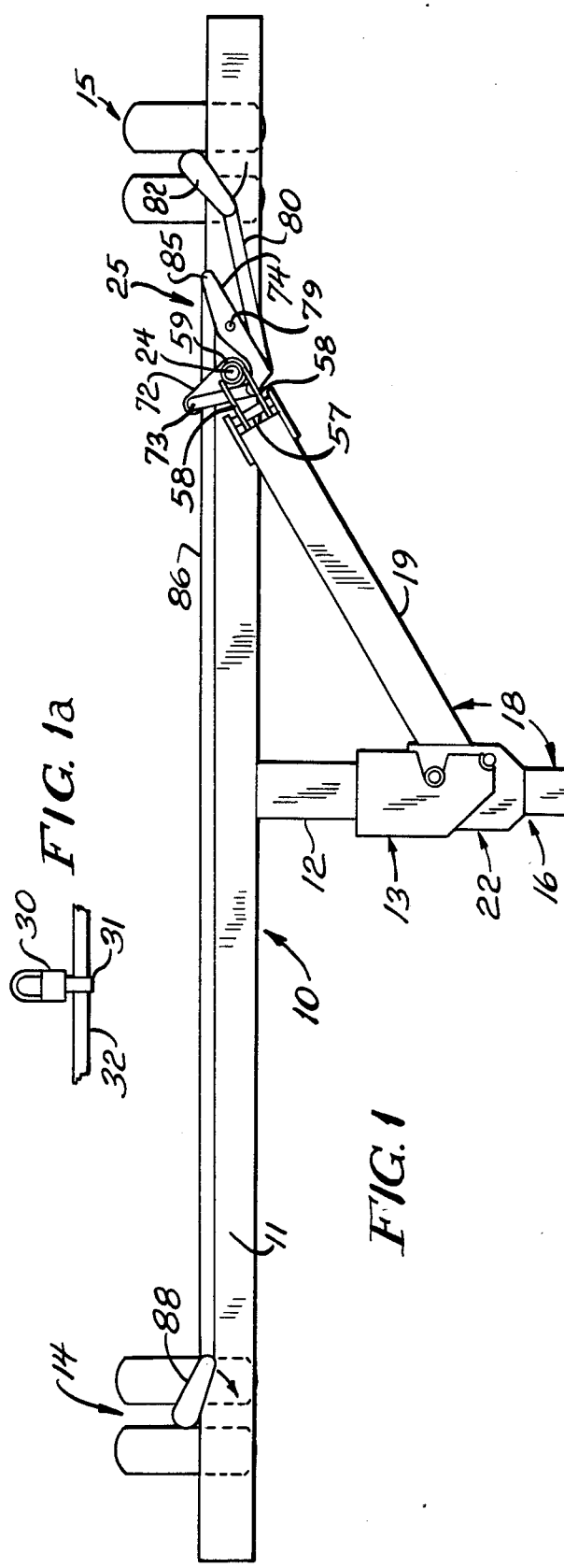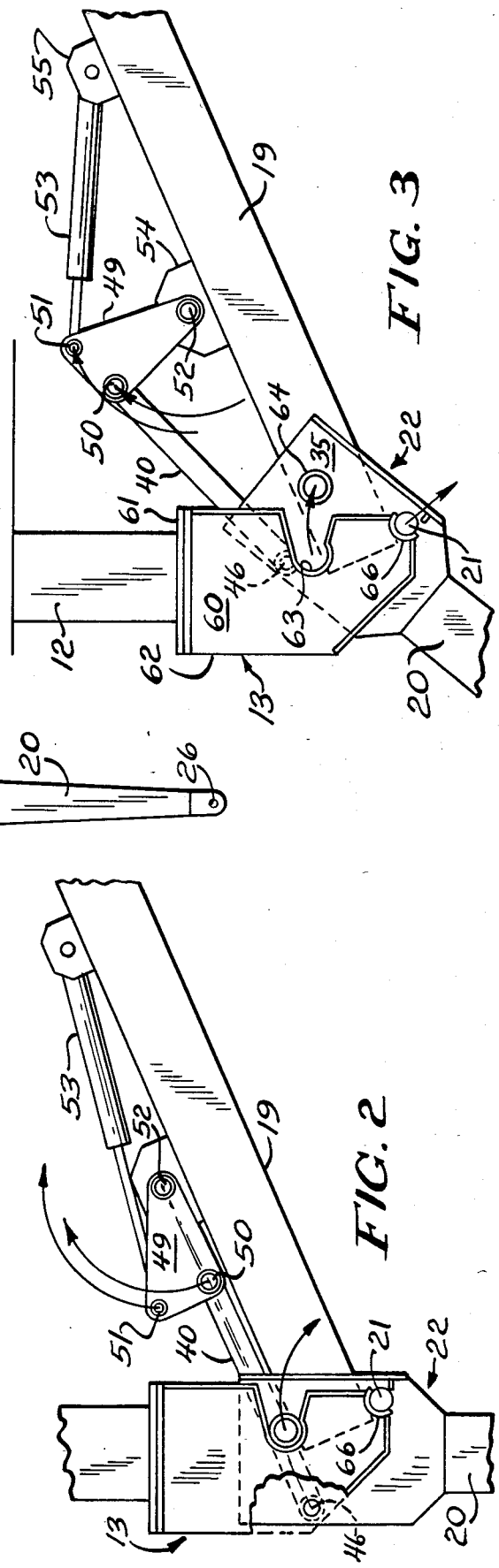

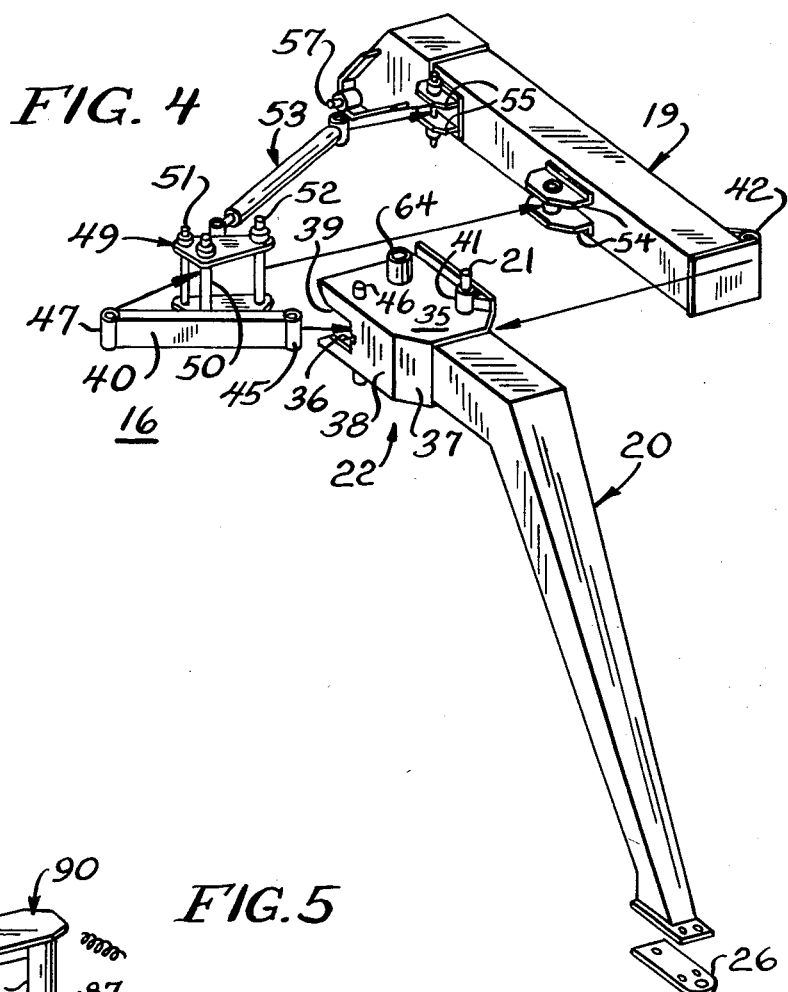
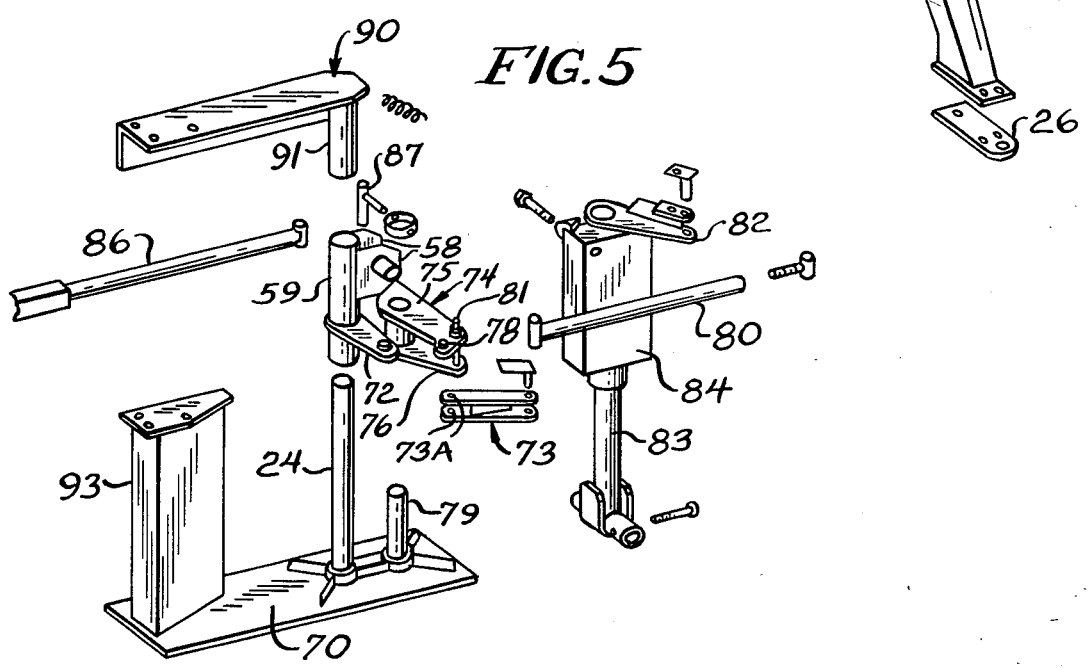

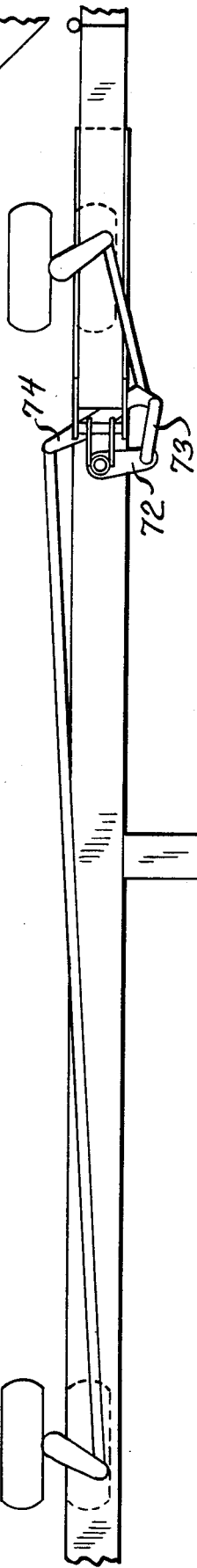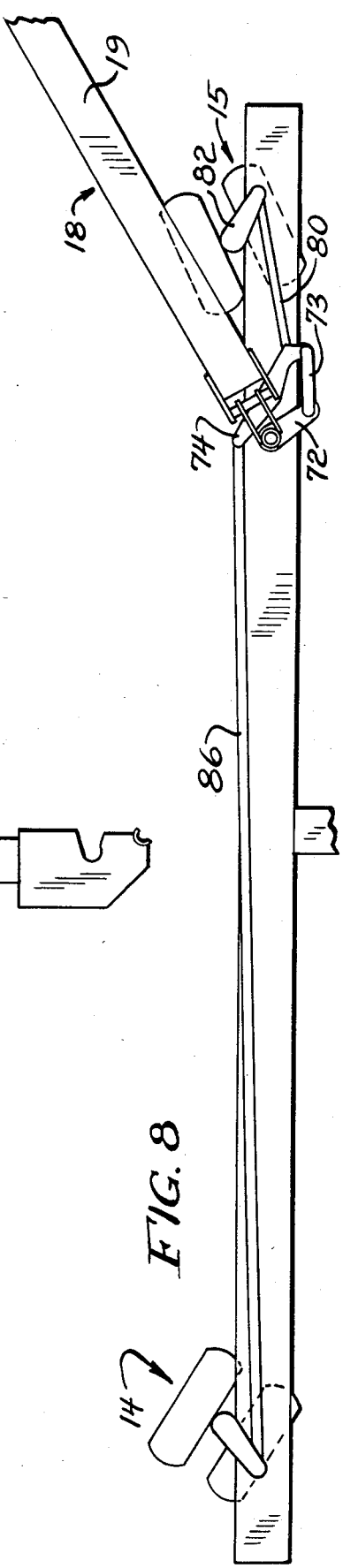

4,552,375

CONVERTIBLE IMPLEMENT FRAME PULLED LENGTHWISE IN THE TRANSPORT POSITION

BACKGROUND OF THE INVENTION

The present invention relates to agricultural implements; and more particularly, to large agricultural implements adapted to be pulled by a tractor with the frame of the implement extending transverse of the direction of travel of the tractor in field use, and extending parallel to the direction of travel for road transport. An implement of this type was disclosed in my co-pending application Ser. No. 424,890 for AGRICULTURAL IMPLEMENT CONVERTIBLE BETWEEN USE AND TRANSPORT POSITIONS, filed Sept. 27, 1982 now U.S. Pat. No. 4,506,904 issued Mar. 26, 1985.

The implement disclosed in the above-identified application was particularly adapted for planting, although the frame (or "carrier" as it is sometimes referred to) is adaptable for a wide range of implements, such as tillage implements, anhydrous ammonia or fertilizer applicators, as well as other uses. The carrier frame of that implement was non-folding, such as the rear-folding frame disclosed in my U.S. Pat. No. 4,117,893, although that carrier frame is articulated in the sense that individual sections may pivot relative to one another about axes parallel to the direction of travel of the tractor during use so as to conform better to variations in the contour of the field. The carrier frame of that implement is attached to the tractor by a hitch assembly which includes a main draft member pivoted at its rear and adaptable to be moved between a use position in which it extends parallel to the direction of travel of the implement and is generally centered on the implement, and a transport position in which it is pivoted to the side and extends generally parallel to the direction of elongation of the frame. A secondary draft member is pivotally connected at its rear end to the main frame at a location between the center and one end of the frame, and its forward end is latched to the forward end of the primary draft member in the use position. In other words, in the use position, the primary and secondary draft members formed a triangle with the carrier frame for rigidity.

When the implement was converted to the road travel configuration, the secondary or inclined draft member acted as a control link, and its forward end was unlatched from the forward end of the primary draft member; and the control link was rotated to the side of the carrier frame to become the primary draft member in road transport. As the secondary draft member is rotated to the road travel position, a steering mechanism is actuated to rotate the support wheels 90° so that they are also used as the support wheels during road transport; and the support wheels are also steerable by the tractor in the road transport position. This implement has proven to be a significant improvement over prior implements, and it has particular advantages as a frame for a large agricultural planter, capable, for example, of transporting as many as 24 individual planter row units spaced laterally relative to one another at 30 inch intervals.

The present invention provides for certain improvements in an implement frame of the type just described, particularly in the hitch mechanism and in the steering mechanism.

By way of convention, the "front" of the implement or frame indicates the direction in which the frame is pulled during field use; and as is conventional, the left and right sides of the frame correspond to the left and right sides of a person looking in the direction of travel during use.

SUMMARY OF THE INVENTION

The improved hitch assembly includes a primary draft member comprising a forward section and a rear section which are articulated at what is referred to as the knee. The rear end of the rear section is connected to the implement frame at an offset position—that is, at a location between the center of the frame and one side. In the field use position, the forward and rear sections are inclined at an obtuse angle like a dog leg, with the forward section centered on the frame and extending parallel to the direction of travel of the implement. The primary draft member is latched at the knee to a forward extension of the main frame by means of a latching mechanism which includes an hydraulic cylinder operable from the operator's position on the tractor. In the use position, the rear section of the primary draft member serves as a brace, cooperating with the forward frame extension and the forward section of the primary draft member to maintain the main planter frame perpendicular to the direction of travel of the vehicle.

When it is desired to convert the implement to the transport position, the hydraulic cylinder is actuated, and the latch mechanism disconnects the knee of the primary draft member from the forward extension of the frame, and it also straightens out the articulated primary draft member so that the forward and rear sections become aligned, and remain that way during transport in which the frame is pulled lengthwise.

In converting the frame from the field use position to the transport position, the primary draft member, after its knee is unlatched from the forward extension of the main frame and it is straightened out, is rotated toward the left side (in the illustrated embodiment) of the planter frame. During this rotation, a steering mechanism is actuated; and the second improvement of this invention over the prior art relates to an improved steering mechanism. There are three primary phases of operation of the steering mechanism. In the first phase, when the planter is set up for field use, the steering mechanism is locked in place with the support wheels extending parallel to the direction of travel of the vehicle (that is, transverse of the direction of elongation of the planter frame). In the second phase, the steering mechanism is actuated to convert the support wheels from the field use position to the transport position. As the primary draft member is rotated from the use position to the transport position, the rear section of the primary draft member rotates to an arc of approximately 150° in the illustrated embodiment. This is because the rear end of the primary draft member is connected to the main frame at an offset position relative to the center of the frame. The steering mechanism, during this second phase of operation, is actuated to turn the support wheels 90° so that they are aligned with the direction of elongation of the main frame and can be used to transport the main frame lengthwise. In doing so, the support wheels on the left side of the main frame are turned counterclockwise when viewed from the top; and those on the right side of the frame are turned clockwise when viewed from the top. The purpose of this is so that they steer correctly in the third phase of operation of the steering mechanism. Thus, the improved steering mechanism incorporates a simple link between a crank arm rotatable with the primary draft member as it converts to the use position, and a center pivot steering link which is pivotally mounted to the main frame and actuates tie rods connected to the support wheels. The steering arrangement enables the wheels to turn 90° to the transport position while the primary draft member rotates more than 90°, yet in the transport position, the support wheels are steered with a higher turning ratio to provide better steering action. This is the third phase of operation of the steering mechanism. In this phase, the support wheels of the planter frame on the side closest to the tractor are steered in the direction of the tractor, whereas those on the far side of the center of the frame are steered in an opposite direction, like the tiller of a truck. The improvements to the steering mechanism obviate the need for complex structures disclosed in the above-identified application, and they are readily adaptable to planters of different size, simply by changing the length of a few of the links involved. Further, the response of the steering mechanism may be changed by altering the length of the steering links, thereby accomodating the steering response of the implement to different applications or to different desired characteristics of the same implement.

Other features and advantages of the present invention will be apparent to persons skilled in the art from the following detailed description of a preferred embodiment accompanied by the attached drawing wherein identical reference numerals will refer to like parts in the various views.

BRIEF DESCRIPTION OF THE DRAWING

FIG. 1 is a plan view, partly in fragmentary form, of an implement carrier frame arranged for field use and incorporating the present invention;

FIG 1A is a diagrammatical plan view of a row unit connected to a transverse mounting bar with the mounting bar in fragmentary form.

FIGS. 2 and 3 are close-up fragmentary plan views showing the hitch latching mechanism in the latched and unlatched positions respectively;

FIG. 4 is an upper, frontal perspective showing the primary draft member with the elements in exploded relation;

FIG. 5 is an upper, frontal perspective view of the steering control mechanism of the planter of FIG. 1 with the parts in exploded relation; and FIGS. 6–8 are plan views of the planter in the transport position illustrating steering to the right, straight ahead, and to the left respectively.

DETAILED DESCRIPTION OF THE ILLUSTRATED EMBODIMENT

Referring now to FIG. 1, reference numeral 10 generally designates an implement frame or carrier frame. The frame 10 can take many forms, but in the illustrated embodiment, it includes primarily an elongated main tubular frame member 11. This may be a 12 in. × 12 in. structural steel tube; and it is provided with a forwardly-projecting extension 12, the forward end of which is provided with a weldment referred to as a head assembly and generally designated 13.

The frame 10 is also provided with a set of dual support wheels 14 on the right side and a similar set of dual support wheels 15 on the left side.

A hitch assembly generally designated 16 is provided for connecting the carrier frame to a draft vehicle. The hitch assembly includes a primary draft member generally designated 18 and including a rear section 19, a forward section 20 and a pivot 21 for connecting the rear section 19 to the forward section 20 at what is referred to as a knee section generally designated 22.

The rear end of the rear draft section 19 is pivotally connected at 24 to the main tubular frame 11. A steering mechanism generally designated 25 couples the rear draft section 19 to the sets of dual support wheels 14, 15 in a manner to be described below.

In FIG. 1, the hitch assembly 16 is latched in the field use position. The forward end of the forward hitch section 20 is provided with a conventional hitch 26 which is adapted to be pinned to the drawbar of a tractor; and the knee section 22 of the primary draft member 18 is latched to the head assembly 13, in a manner to be described in more detail below. In this configuration, the rear draft section 19 acts as a brace for maintaining the main tubular frame member 11 in a transverse relation relative to the direction of travel of the tractor. The steering mechanism is inoperative in this position, so that the dual wheels 14, 15 are aligned parallel to the direction of travel.

When the carrier frame is adapted for use as a planter, individual row units such as that diagrammatically illustrated at 30 FIG. 1A may be connected by a conventional four-bar linkage 31 to a transverse mounting bar 32. The mounting bar 32, in turn, is pivotally connected to the main tubular frame member 11, preferably in a manner such that the mounting bar 32 and the associated row units 30 can be raised by an hydraulic cylinder (not shown) for road transport, such as is disclosed in the above-identified application. This has the advantage of using the main frame for mounting central hoppers for seed or fertilizer or insecticide/herbicide, if desired. At the same time, the individual row units could be adapted to be mounted in front of the main tubular frame member 11 and driven by it as the planter is pulled, in the manner disclosed in my co-pending application Ser. No. 534,541, for AGRICULTURAL ROW CROP PLANTER WITH REAR-DRIVEN ROW UNITS.

Turning now to FIG. 4, the hitch assembly 16 will now be described in more detail. The knee section 22 is a weldment welded to the rear of the forward draft section 20; and it includes a top plate 35, a bottom plate 36, a forward side plate 37 and a side plate 38. The side plate 38 is cut away at 39 to receive a link 40. The knee section thus comprises a receptacle for the forward end of the rear draft section 19. To accomplish this, a sleeve or bushing 41 is welded to the top of the top plate 35 of the knee section; and a similar bushing is welded beneath the bottom plate 36, but cannot be seen in the drawing. A corresponding sleeve or tube 42 is welded to the outboard, forward end of the rear draft section 19, and it is aligned with the bushing 41 of the knee section to receive the pin 21 and thereby form a hinge between the two draft sections 19, 20.

The right side of link 40 also forms a sleeve or bushing 45 for receiving a pin 46 which pivotally secures the one end of the link 40 to the knee section 22. Similarly, the left side of link 40 forms a sleeve 47 which is pivotally connected to a triangular shaped link generally designated 49 by means of a pin 50. It will be observed that the link 49 actually comprises top and bottom plates for strength. The link 49 includes two other pivot pins designated 51 and 52 respectively. Pin 51 pivotally connects the rod end of an hydraulic cylinder 53 to the link 49; and pin 52 pivotally connects the link 49 to an intermediate location on the rear draft section 19 by means of mounting brackets 54. The rear or butt end of hydraulic cylinder 53 is similarly connected to the rear of the rear draft section 19 by means of brackets 55. The lower rear portion of the rear draft section 19 is also provided with a pivot pin 57 which forms a horizontal pivot axis for the primary draft member 18. The primary draft member 18 does not pivot about this axis during normal field use because the knee section 22 is latched rigidly to the head assembly 13 and vertical motion is restrained. However, this pivot action is useful in the road transport position so that the weight of the planter is not transmitted through the draft assembly to the drawbar of the tractor. The pin 57 is journaled in mounting plates 58 which are, in turn, welded to a sleeve 59, as best seen in FIGS. 1 and 5. The sleeve 59 is rotatably received on the pivot shaft 24, as will be described below.

Referring now particularly to FIGS. 1–3, the head assembly 13 is a weldment which includes a top plate 60, a bottom plate similar in shape, but not seen in the drawing, an end plate 61 which is welded to the forward end of the frame extension 12, and a side plate at 62 which interconnects and strengthens the top and bottom plates to form a receptacle or housing which receives the knee section 22.

Specifically, the top and bottom plates of the head assembly 13 define a latching receptacle 63 which receives a tubular latch member 64 welded to the upper surface of the top plate 35 of the knee section 22. A similar tubular latch member is welded to the bottom surface of the corresponding bottom plate of the knee section and received in a corresponding latch receptacle on the bottom plate of the head assembly.

Similarly, the forward left corner of the head assembly provides a curved bearing member 66 which engages the upper portion of the pivot pin 44 in the latched condition.

It will be observed that the space leading into the latch receptacle 63 increases to facilitate insertion and removal of the latch member 64 which action is guided, as will be described presently, by engagement of the pin 44 against the curved bearing surface 66 as the knee section 22 is received in the head assembly 13.

Turning now particularly to FIGS. 2 and 3, the latching and unlatching of the primary draft member 18 to the forward frame extension 12 by means of the head assembly 13 will now be described in detail. It will be observed that the components shown in FIG. 4 are seen in assembled relation in FIGS. 2 and 3, but the details of the hydraulic cylinder and actuating linkages are omitted from FIG. 1 for clarity.

As seen best in FIG. 2, in the locked position, the cylinder 53 is extended, thereby forcing the triangular link 49 counterclockwise as seen from the top. This causes the link 40 to become more aligned with the base of a triangular link 49 and increasing the distance between pivot pin 46 of the link 40 and pivot pin 52 of the triangular link 49. Since the pin 52 is mounted to the rear draft section 19, whereas the pin 46 is mounted to the knee section 22, and thus the forward draft section 20, extension of the hydraulic cylinder 53 has the effect of rotating the forward draft section 20 counterclockwise relative to the pin 44 and the rear draft section 19. During latching of the primary draft member 18 to the head assembly, the pin 21 is first guided against the bearing surface 66 by maneuvering the tractor into place. The hydraulic cylinder 53 is then extended to pivot the rear and forward draft sections 19, 20 about the pin 21 and also forcing the latch member 64 into engagement with the latch receptacle 63. In the latched position, the axis of pin 50 of the triangular link 49 is "over center" relative to a straight line drawn between the axis of pin 46 on the link 40 and the axis of pin 52 of the link 49 (see FIG. 2). In this manner, even if hydraulic power is lost for the cylinder 53, the primary draft member 18 remains latched to the forward frame extension.

When it is desired to unlatch the primary draft member from the forward frame extension, the cylinder 53, which is a double-acting hydraulic cylinder, is retracted by forcing fluid into the rod end. This causes the triangular link 49 to rotate clockwise about the pivot pin 52, and also causes the pivot pins 50, 51 to rotate clockwise about pin 52. This action, in turn, translates the link 40 in the direction seen by comparing FIGS. 2 and 3, and causes the forward draft section 20 to rotate clockwise about the pivot pin 21. This causes the forward and rear draft sections 19, 20 to become aligned (i.e., their axes extend in a common vertical plane). It has the further effect of dislodging the latch member 64 from the latch receptacle 63, so that the operator of the tractor can then position the tractor to the left of the frame 10 for transport. In the latched condition, it will be observed that the rear draft section 19 does not pivot about either its vertical pivot axis (pivot shaft 24) or its horizontal pivot axis (pin 57 of FIG. 4). During the unlatching action, assuming that the tractor remains stationary, as the forward and rear draft sections 19, 20 become aligned, the left side of the frame 10 will move rearwardly.

Referring also to FIG. 5 which is an exploded view of the steering mechanism, a main plate 70 is bolted to the top of the main frame tube 11. The rear end of the rear draft section 19 is connected to the sleeve 59 via brackets 58 and pin 57, which forms the horizontal pivot axis for the draft member 18 in the transport position. The vertical pivot axis of the draft member is formed by the vertical pivot shaft 24 which extends upwardly of the plate 70 as best seen in FIG. 5. The sleeve 59 is received on the pivot shaft 24. A crank arm 72 is welded to the sleeve 59. The outboard end of the crank arm 72 is pivotally mounted to a double link 73. The other end of the link 73 is connected to a center pivot link 74 which has an upper plate 75 and a lower plate 76. The double link 73 is connected via pin 78 to the upper plate 75 of the link 74. The link 74 is rotatably mounted on a pivot tube 79 which is welded to the top of the plate 70 spaced from the previously described pivot shaft 24. A tie rod 80 is connected to link 74 by means of a pin 81. The tie rod 80 (which is adjustable in length), in turn, is connected to a steering arm 82 attached to a pivot tube 83 which is journaled in a tower assembly 84 for mounting support wheels 15 to the main frame 10. As seen in FIG. 5, the steering mechanism is in the transport position.

Center pivot link 74 is connected to the double link 73 at apertures 73A via pin 78, as mentioned. It is also connected to the tie rod 80 which is connected to the left side support wheels. As best seen in FIG. 1, the pivot link 74 extends rearwardly and connects at 85 to another tie rod 86 by means of pin 87. Tie rod 86 is connected to another steering arm 87 for steering the right side support wheels 14.

In assembled relation, the sleeve 59 which is received on the pivot shaft 24 is held in place by means of a cap weldment generally designated 90 which includes a tube 91 which fits over the top of the shaft 24 when the weldment is bolted to an upstanding spacer 93. For clarity, the cap weldment is not shown in any of the other figures of the drawing.

The operation of the steering mechanism will now be described. As has already been described, actuation of hydraulic cylinder 53 unlatches the primary draft member 18 from the frame extension 12; and as the cylinder 53 is retracted, the forward frame section 20 pivots about pin 21 to become aligned with the rear frame extension 19. As this happens, the latch member 64 is withdrawn from the latch receptacle 63 as illustrated in FIG. 3, and this action causes the left side of the main frame to move toward the rear. This also causes the rear end of the rear frame section 19 to rotate counterclockwise about the vertical pivot shaft 24. As the sleeve 59 rotates about the vertical pivot shaft 24, the crank arm 72 is likewise rotated counterclockwise about the shaft 24. However, because the link 73 is generally aligned with the crank arm 72, during the initial rotation of the draft member 18, the center pivot link 74 rotates through an angular displacement less than that of the primary draft member.

That is, after the primary draft member 18 is unlatched from the head assembly 13, and the forward and rear draft sections 19, 20 become aligned, the farmer then drives his tractor to the left side of the main frame. During the first 90°-100° of rotation of the rear draft section 19 to the position of FIG. 6, the center pivot link 74 is rotated approximately 70°-75° (as will be observed by comparing FIGS. 1 and 6). The reason for this is that the center pivot link 74 controls the rotation and steering of the support wheels and they must move through a 90° angle in converting from the use position to the transport position (compare FIGS. 1 and 7, for example), whereas the rear draft member 19 rotates through an angle of approximately 150° in converting from the use position to the transport position. The advantage of the linkage including crank arm 72 (which does rotate with the rear draft section 19), double link 73 and center pivot link 74 is that the initial rotation of the draft member is transmitted through the tie rods 80, 86 to the steering arms 82, 88 in a much lower steering or turning ratio, whereas when the draft member is in the transport position of FIG. 7, the actual steering ratio is much higher than originally and provides a truer steering for the operator. Another way of demonstrating this is to compare the position of the double link 73 in the use position of FIG. 1 and the transport position of FIG. 7.

In the position of FIG. 1, the crank arm 72 extends almost parallel to the connecting link 73 so that very little of the rotary motion of the crank arm 72 is transmitted through link 73 to rotate link 74. On the other hand, in the position of FIG. 7, the link 73 is perpendicular to crank arm 72 so that the linkage forms a four-bar linkage and is efficient in transmitting rotary motion of sleeve 59 to link 74. Thus, in the road travel position, as the primary draft member rotates, the link 72 rotates correspondingly, and that motion is translated to a more direct rotation of the link 74 via link 73.

It is the link 74 which, of course, steers the support wheels 14, 15.

In converting from the use position to the transport position, the link 74 rotates counterclockwise approximately 90° from the position of FIG. 1 to the position of FIG. 7. In doing so, the tie rod 80 rotates steering arm 82 90°; and tie rod 86 rotates steering arm 88 by the same amount. From the position of FIG. 7, if the tractor turns to the left, the primary draft member 18 turns to the position of FIG. 8; and this causes the pivot link 74 to rotate still further counterclockwise. This rotation, in turn, forces tie rod 80 to the right, turning the left support wheels 15 in the direction in which the tractor is turning, but the same rotation of the link 74 shifts tie rod 86 to the left, rotating the right support wheels 14 to be steered around the turn rather than into it. Similarly, by comparing FIG. 6 with FIG. 7, as the tractor turns to the right, again, the left support wheels 15 are steered in the direction of the turn; whereas the right support wheels 14 are turned in the opposite direction to move the far end of the implement around the turn.

It will thus be appreciated that the steering mechanism disclosed herein is an improvement over that disclosed in my earlier application in that it eliminates many expensive parts and, of greater importance, the steering structure disclosed herein can be modified simply by changing link dimensions and locations of pivot points relative to one another, to accomodate implement frames of different widths.

Having thus disclosed in detail preferred embodiments of the inventions, persons skilled in the art will be able to modify certain of the structure which has been illustrated and to substitute equivalent elements for those disclosed while continuing to practice the principle of the invention; and it is, therefore, intended that all such modifications and substitutions be covered as they are embraced within the spirit and scope of the appended claims.

I claim:

1. In an agricultural implement having an elongated frame and adapted to be converted between a use position in which the frame extends transverse of the direction of travel and a transport position in which said frame is pulled lengthwise, the improvement comprising: an articulated draft member including a forward section and a rear section pivotally connected together; means for mounting the rear end of the rear section to said frame for rotation about a vertical axis and at a location between the transverse center of said frame and one end thereof; and extension means for connecting said draft member to said frame in the use position at a location adjacent the pivotal connection between said forward and rear sections thereof, whereby in the use position, said rear section of said articulated draft member acts as a brace to maintain said frame transverse of the direction of travel of said implement and said forward section of said draft member is generally parallel to the direction of travel of said implement, and in the transport position, said forward and rear sections of said draft member are aligned and extend generally parallel to the direction of elongation of said frame.

2. The apparatus of claim 1 further comprising hydraulic cylinder means for moving said articulated draft member between said use and transport positions under power.

3. The apparatus of claim 2 wherein said extension means comprises forward frame extension means rigidly attached to said frame and extending forwardly of the center thereof for receiving and coupling to said articulated draft member adjacent the pivotal connection between the forward and rear sections thereof in the use position.

4. The apparatus of claim 3 wherein said forward frame extension includes a bearing guide surface and a latch receptacle; and further comprising a knee section for interconnecting the forward and rear sections of said articulated draft member, said knee section providing first pivot means for engaging said bearing surface of said forward frame extension during conversion to the use position, and a latch member for coupling to said latch receptacle thereof in the latched position.

5. The apparatus of claim 4 further comprising link means interconnecting said forward and rear draft sections and actuated by said hydraulic cylinder means for articulating said forward section relative to said rear section and causing said latch member to engage said receptacle in locking said articulated draft member to said frame extension with the rear section thereof in bracing relation with said frame extension, and the forward section thereof latched in a direction parallel to the direction of travel of said implement.

6. The apparatus of claim 5 wherein said link means comprises first and second links pivotally connected together, one of said links being connected to said rear section of said draft member and actuated by said hydraulic cylinder, and the other of said links being pivotally connected to said forward section, and characterized in that said links are locked in an over center position when said hydraulic cylinder is extended and lock said articulated draft member in the use position, whereby said member remains locked in the use position in the event of loss of hydraulic pressure in said cylinder.

7. The apparatus of claim 1 further comprising steering linkage means responsive to the rotation of said articulated draft member between the use position and the transport position for actuating steering mechanism; and steerable support wheel means for supporting said frame in both the use and the transport positions, said steering mechanism being actuatable by the rotation of said draft member from the use position to the transport position to turn said support wheel means approximately 90° and in line with the direction of elongation of said frame.

8. The apparatus of claim 7 characterized in that said support wheel means comprise first support means on the left side of said frame and second support wheel means on the right side of said frame, said support wheel means being actuated by said steering mechanism to rotate in counter directions and in response to the rotation of said articulated draft member.

9. The apparatus of claim 8 wherein said steering mechanism includes a pivot link pivotally mounted for rotation about a vertical axis on said frame and displaced laterally relative to the vertical axis of rotation of said connecting draft member; a crank arm connected to said connecting draft member for rotation therewith; and a connecting link between said crank arm and said pivot link and characterized in that when said connecting draft member is in the use position, said connecting link is generally aligned with said crank arm and when said connecting draft member is in the transport position, said connecting link is generally perpendicular to said crank arm.

10. In an agricultural implement including a main frame elongated in a direction transverse of the direction of travel in the use position and adapted to be pulled lengthwise for road transport, and first and second support wheel means for supporting said main frame, the improved combination comprising a draft member rotatable between a use position and a road travel position, said draft member being generally parallel to the direction of elongation of said frame in the road travel position; means for connecting the rear end of said draft member to said frame for rotation about a vertical axis offset from the center of said frame; and steering means responsive to the turning of said draft member from the use position to the road transport position for turning said first and second support wheel means in counter directions to align with the direction of elongation of said frame in the road travel position and characterized in that said steering means is operative to steer said implement in response to turning of said draft member when said draft member is in the transport position.

11. The apparatus of claim 10 wherein said steering means comprises a crank arm connected to rotate with said draft member about said vertical axis of rotation thereof; a pivot link mounted to said frame and adapted to rotate about a vertical axis displaced from the vertical axis of rotation of said draft member; tie rod means responsive to the rotation of said pivot link for rotating said support wheel means; and connecting link means connecting said crank arm to said pivot link for rotating the same between the use position and the road travel position.

12. The apparatus of claim 11 characterized in that said connecting link means is generally aligned with said crank arm in the use position and generally perpendicular to said crank arm in the transport position, whereby the steering ratio of said support wheel means relative to the turning of said draft member is lower in the use position and higher in the road travel position.

* * * * *

UNITED STATES PATENT AND TRADEMARK OFFICE
CERTIFICATE OF CORRECTION

PATENT NO. : 4,552,375
DATED : Nov. 12, 1985
INVENTOR(S) : Jon E. Kinzenbaw

It is certified that error appears in the above-identified patent and that said Letters Patent is hereby corrected as shown below:

In Claim 9, lines 3, 4, 7 and 9, before the words "draft member", delete the word "connecting".

Signed and Sealed this

Eighteenth Day of February 1986

[SEAL]

Attest:

DONALD J. QUIGG

Attesting Officer

Commissioner of Patents and Trademarks